United States Patent [19]

Wierlo

[11] 3,830,407
[45] Aug. 20, 1974

[54] BLENDER FOR MULTI-FLAVORED MILKSHAKE MIXING

[75] Inventor: Edward Wierlo, Seattle, Wash.

[73] Assignee: Sweden Freezer Manufacturing Company, Seattle, Wash.

[22] Filed: June 29, 1972

[21] Appl. No.: 267,454

[52] U.S. Cl............... 222/145, 222/342, 222/411, 222/559, 259/7, 259/107
[51] Int. Cl............................................. B67d 5/60
[58] Field of Search ........... 222/293, 268, 271, 273, 222/274, 342, 392, 408 S, 411–413, 522, 525, 559, 129–129.4, 132, 145, 144.5; 259/7, 8, 23, 24, 43, 44, 107, 108

[56] References Cited
UNITED STATES PATENTS

| | | | |
|---|---|---|---|
| 1,751,097 | 3/1930 | Nelson | 259/107 |
| 2,646,974 | 7/1953 | Read | 222/342 |
| 2,779,167 | 1/1957 | Faro | 259/108 |
| 2,925,102 | 2/1960 | Cummings et al. | 222/525 |
| 3,224,740 | 12/1965 | Kuehn et al. | 222/145 |
| 3,228,563 | 1/1966 | Rankin et al. | 222/129 |

Primary Examiner—Allen N. Knowles
Assistant Examiner—H. Grant Skaggs, Jr.

[57] ABSTRACT

A multi-flavor dispensing freezer which will selectively dispense a flavored food product in any one of a plurality of flavors. An unflavored comestible, such as ice cream, frozen custard, or the like, is forced into a dispensing nozzle. As the comestible flows toward the exit of the nozzle it is intermixed with the desired flavor. A combination of agitator-mixer-scraper mounted within the dispenser nozzle and which rotates at a rapid speed, with a scraper cleaning the syrup from the wall of the mixing chamber. The syrup being heavier and with a lower freezing point than the bulk milk mixture, is thrown out of solution by centrifugal force but is then folded back into solution with the body of the mixture as it rapidly passes through the chamber. This action causes complete mixing of the unflavored comestible and desired flavor, such that the product dispensed is uniform in color and flavor and between the centrifugal force of the fast turning agitator and the scraper blades, leaves the surfaces of the equipment clean and relatively free of food product, avoiding dripping and carry-over between flavors without other cleaning, in rapidly serving product.

4 Claims, 6 Drawing Figures

PATENTED AUG 20 1974 3,830,407

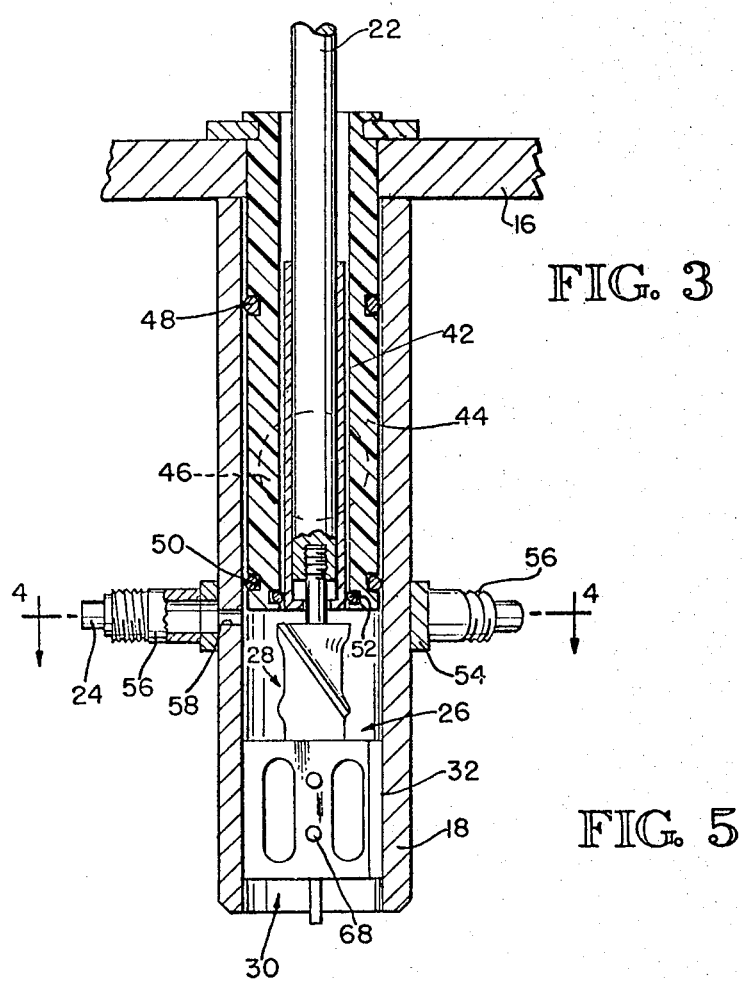
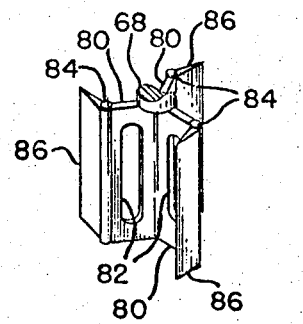
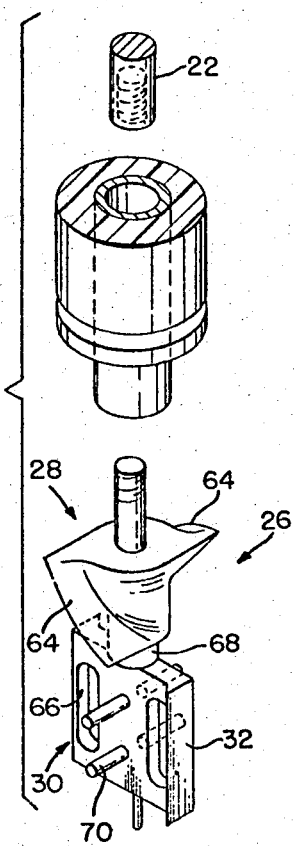
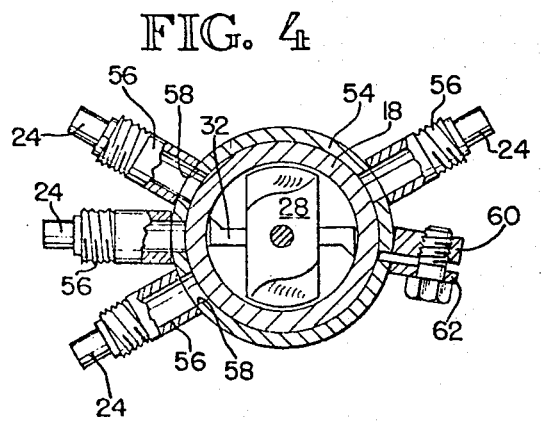

BLENDER FOR MULTI-FLAVORED MILKSHAKE MIXING

BACKGROUND OF THE INVENTION

The present invention relates to dispensing freezers for frozen comestibles, such as ice cream, frozen custard, milkshakes, slush, ice, etc. and more particularly to machines of this type which can dispense more than one flavor of frozen product without requiring a large storage capacity of each flavor such as would be required if the product were stored in a premixed condition.

A principal object of the invention is to provide an improved dispensing freezer the use of which permits the operator to conveniently and selectively dispense from the same machine milkshakes and the like having a variety of flavors. The basic ingredient is stored in an unflavored condition and flavored as it is dispensed. It is critical in a dispensing operation of this nature that the separate flavors be completely sealed off when not in use so that the flavor desired is not contaminated by seepage of the other flavors. It is also important in dispensers of this type that the flavor desired be completely mixed with the Unflavored comestible such that the end product is uniform in coloration and flavor by the time it exits from the nozzle and the product can be dispensed and mixed very quickly.

Prior art dispensing mechanisms have had the ability to dispense more than one flavor; however, they have either proven to be inadequate in that they did not provide uniform blending of the flavor with the comestible and dispensing the mixture at a high speed or alternatively have involved mechanism which is extremely complex and difficult to maintain in the necessary sanitary condition.

With the above known prior art and inherent problems in mind, it is an object of the present invention to provide a multi-flavor dispenser wherein the flavoring is immediately and completely blended with a comestible such that the end product is uniform.

Another object of the present invention is to provide a unique blending amd mixing device which assures that the material which passes thereby is completely blended and mixed, it being understood that this must be accomplished in a short period of time, since the comestible which is subjected to the agitation is continuously flowing toward a nozzle during the agitation and thus does not return for further agitation.

It is another object of the present invention to provide a multi-flavored dispensing mechanism which is quickly and easily cleaned such that there is very little contamination of one flavor with another and further eliminates the need for a large storage capacity.

Still another object of the present invention is to provide a mixer blade having a cylindrical enclosure which shears a passing stream of material several times as well as generating a swirling action transverse to the direction of flow in addition to a swirling action generally parallel to the direction of flow assuring a complete and uniform product.

Yet another object of the present invention is to provide a mixer blade which scrapes the walls of the mixer chamber leaving them clean and remixing the syrup throughout by centrifuged force from the high speed blade.

BRIEF DESCRIPTION OF THE DRAWINGS

FIG. 3 is a vertical sectional view through the dispensing nozzle of the present mechanism depicting the interrelationship of the various elements.

FIG. 4 is a sectional view along line 4—4 of FIG. 3 disclosing the relationship of the various flavor dispensing ports.

FIG. 5 is an exploded perspective view of the main portions of the dispensing and mixing nozzle mechanism as well as particularly showing the configuration of the mixing blade.

FIG. 6 is an enlarged perspective view of yet another possible configuration of the scraper portion of the mixing element.

DETAILED DESCRIPTION OF THE DRAWINGS

Figure 1:
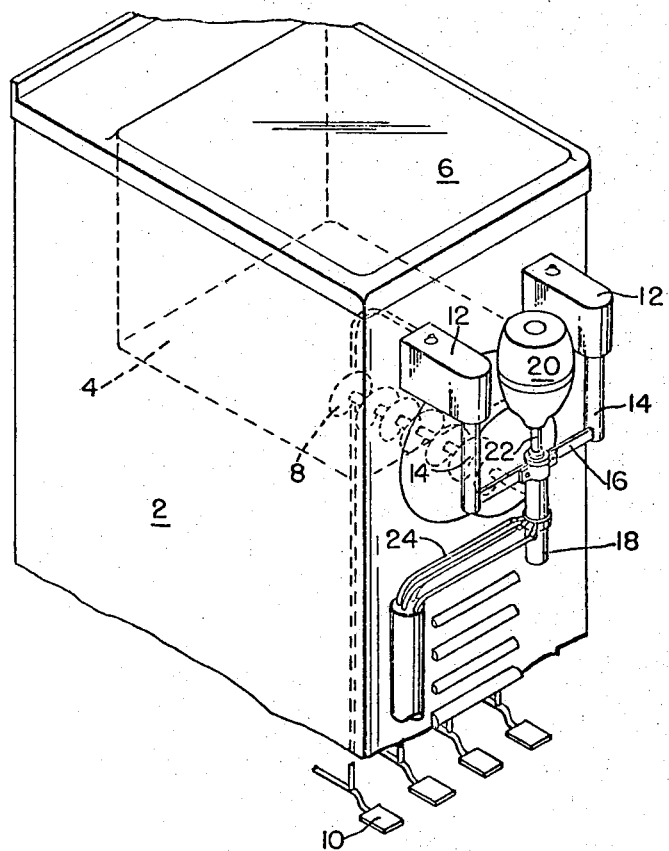
FIG. 1 is a perspective view generally showing the environment of the present invention and the relative location of the major elements thereof.
Figure 2:
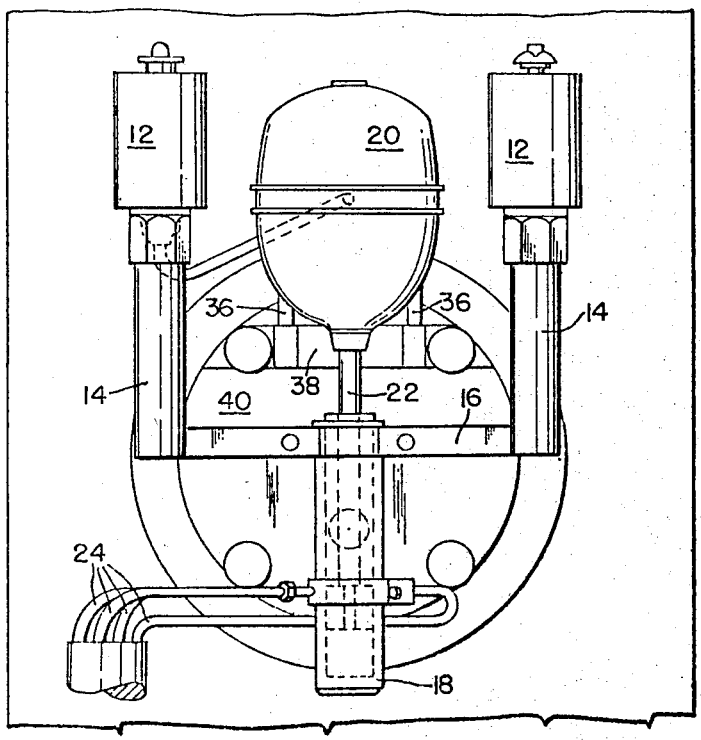
FIG. 2 is a front elevational view of the dispensing portion of the present invention further depicting the relative location of the exterior elements.

As seen in FIG. 1, the milkshake dispenser, which is used for illustrative purposes, includes a streamlined attractive outer cabinet 2 having located in the upper portion thereof a storage tank 4 normally having an opening at the top of the cabinet 6 for the addition of further comestibles. The cabinet would further include interior refrigeration coils, compressor motor and other mechanisms and interconnections necessary to keep comestibles held within the storage tank 4 at a refrigerated condition necessary for maximum usable life. Mounted beneath the storage tank 4 is a screw-type conveyor or dasher 8 which scrapes the frozen product from the walls of the freezer cylinder, blends it with the unfrozen product and whips air into the mixture. while conveying the product to the outlet is a function of the dasher in the illustrative unit this is not critical to the present invention and the product could be forced to the nozzle by pump means or the like. The conveyor or dasher 8 carries the comestible upon demand from an outlet at the bottom of the storage tank 4 forwardly and out a nozzle conveniently located for flow into a receptacle as to be explained in greater detail hereinafter.

One of the problems which is faced by an employee attempting to draw a comestible from a dispenser of this type, is that in many cases the demand will be such that the employee will have two or more containers for receptacles which he must juggle while operating the mechanism. Since this problem is not one of infrequent occurrence, many of the dispensers include pedals 10 at the bottom of the dispenser allowing the operator to begin dispensing the comestible as well as mixing any one of several flavors by stepping on a desired pedal thus leaving the operator's hands free to support the containers. other approaches to this problem have been container-operated switch mechanisms which begin the dispensing, or alternatively timed devices such that the operator may turn on the switch knowing that it will turn off when the proper amounts have been dispensed.

In the apparatus used for illustration in the present application the problem is solved by the use of a plurality of pedals 10 located at a floor level. As will be explained hereinafter each of the pedals will have a specific purpose, but in addition to this purpose, each of the pedals will begin the dispensing operation by starting the screw conveyor 8, opening the nozzle and starting the agitator-mixer-scraper device, which will be described in greater detail hereinafter.

Mounted on the front of the cabinet is a pair of brackets 12 which conceal wiring or other necessary interconnections as well as serving as mounting the slide guides for a pair of depending plungers 14. Plungers 14 extend downwardly to an interconnecting yoke 16 which is rigidly interconnected with and controls movement of a nozzle valve or gate as explained hereinafter. Mounted directly above a hollow nozzle 18 is a motor means 20 which has shaft 22 extending downwardly into the nozzle means 18.

Secured to the exterior of the nozzle means and being in fluid communication with the interior thereof are a plurality of dispensing tubes 24. Each of the tubes 24 will extend to the interior of the cabinet whereat an isolated storage container is located. Each of the storage containers (not shown) would hold a supply of flavoring which would selectively be dispensed into and mixed with the comestible as desired. It is, of course, critical that the flavors be selectively dispensed into and mixed with the comestible as desired. It is, or course, critical that the flavors be kept as isolated as possible to prevent contamination of another flavor. Since the flavoring used is of a concentrated form, the introduction of even a small amount of one flavor into another would materially alter the final product. As an additional means of limiting contamination, one of the tubes 24 may be interconnected with a source of water such that the dispensing nozzle may be flushed before a different flavor is dispensed.

Referring now to FIG. 3, it can be seen that the shaft 22 drives down through the center of the nozzle 18 and has attached thereto at its lower portion an agitator-mixer 26 having an upper portion 28 with tapered paddles and a lower portion 30 with scrapers 32 and outwardly extending integral stabilizers 68.

The motor 20, its depending shaft and the agitator mixer 26 are vertically stable although illustrated as a rigid shaft, a flexible shaft or other means of transmitting rotary motion could equally well be utilized. The motor 20 is supported by a pair of downwardly depending legs 36 which are received in upwardly opening bores in a bracket 38 which is secured to a cover 40 which closes the end of the cavity surrounding the screw conveyor 8. The nozzle 18 is likewise held vertically stable, since it is an integral portion the cover 40.

Mounted interiorly of the nozzle 18 and between the rotating shaft 22 in the interior surface of the nozzle 18 is a sleeve 42 which fits securely to the rotating shaft 22 and within the interior of a vertically movable gate 44. Gate 44 is secured to the yoke 16 and moves therewith selectively dispensing the comestible. The outlet 46 from the cavity containing the screw conveyor 8 is approximately midway the vertical distance of the nozzle 18. The yoke 16 which is operated upon by a pedal as described hereinabove is secured to the sleeve or gate 44 such that the movement of the yoke 16 caused by any one of the pedals similarly causes movement of the gate 44 moving it vertically such that it opens and closes the opening 46. There are appropriate seals 48, 50 and 52 surrounding the sleeve or gate to prevent seepage of the comestible substance into the operating area.

Secured to the outer periphery of the nozzle 18 is a syrup ring or band 54 having a plurality of fittings 56 secured thereto which are in turn connected to the tubing 24. The band 54 is located around the nozzle 18 such that the fittings 56 are in axial alignment with a plurality of bores 58 which extend through the nozzle 18 to the interior, where the comestible will be passing. In operation each one of the individual tubes 24 could contain a different flavoring concentrate to be intermixed with the comestible. However, for purposes of having a perfectly clean dispensing nozzle such that one flavor does not mix with the other, as noted above, one of the inlet ports would be supplied with water, such that after each flavor usage the nozzle portion will be flushed and cleaned of any residue. The band 54 will be secured in position by a clamping action between the outwardly extending tabs 62 (FIG. 4), one of which is threaded and the other having a bore, such that a standard threaded member can be placed through the bore and the entire band 54 clamped by tightening of the threaded member into the threaded portion.

As best seen in FIG. 5, the agitator-mixer-scraper 26 comprises an upper portion 28 and a lower portion 30. The upper portion 28 has a pair of opposed configured paddles 64 which tend to cause a swirling action of the comestible and the hereinbefore introduced flavoring. The movement of the paddles through the moving comestible will cause cavitation within the substance as well as the swirling action in a direction generally transverse to the flow of the comestible. The top as well as the bottom of the upper portion 28 provides a shear action causing the comestible and the concentrated flavoring to be broken into smaller particles which are subjected to the swirling action. As the comestible proceeds in the discharge nozzle the upper portion of the lower section 30 likewise causes a shear action, again breaking the flow into particles. The vanes or scraper 32 upon the lower portion 30 cause the comestible to be swept away from the interior surface of the nozzle and into the openings 66 whereat the comestible and the concentrated flavoring are thoroughly mixed. At approximately 90° to the outwardly extending paddles 32 are a pair of outwardly extending balancing members 68 which are in contact with the inner part of the nozzle and serve to maintain the agitator and mixer 26 in proper alignment. In addition to the stabilizing function of members 68 these members also pass through the comestible causing further agitation and intermixing thereat. The agitator mixer 26 thus subjects a flavoring comestible to at least four shear actions as well as two swirling actions in different planes in addition to a scraping action thus assuring a completely admixed product. Although a two bladed scraper has been illustrated it is to be understood that any balanced configuration utilizing a scraper action could well be utilized.

As seen in FIG. 6, the lower portion of the agitator may well have three paddles 80 with openings 82 therein. The outermost portion of the paddles 80 is hinged at 84 such that the actual scraper portion 86 will continuously be forced against the walls of the enclosing chamber or nozzle.

Thus it can be seen, the combination of a means to wash the interior of the nozzle assuring that each time that the flavors change a clean nozzle will be presented as well as the unique twisting, turning agitating, shearing, scraping and sweeping action of the agitator within the nozzle, assuring that the comestible, when it is discharged, is of a uniform flavor and color, the concentrated flavoring being thoroughly intermixed with the comestible itself.

The embodiments of the invention in which an exclusive property or privilege is claimed are defined as follows:

1. A dispensing device for an unflavored comestible incorporating a distributor mechanism for introduction of a desired flavor into the comestible being dispensed and a blender device for uniformly blending the flavor into the unflavored comestible, comprising:

a dispensing nozzle having a first port therein for introduction of an unflavored comestible therethrough and one or more additional ports downstream from the first port for introduction of a desired flavor into the unflavored comestible, a moveable, internal, axial sleeve mounted in the dispensing nozzle for controlling flow of the unflavored comestible into the nozzle, means for continuously feeding the unflavored comestible through the first port, means for introducing flavoring through the additional port, a rotatable shaft extending into the dispensing nozzle, means for rotating the shaft, and blender means extending longitudinally within the dispensing nozzle and mounted to the end of the shaft downstream from the point of introduction of the flavoring into the unflavored comestible, the blending means including (1) an upstream portion having outwardly extending blades with surfaces at an angle to the axis of the shaft for imparting a swirling motion and shearing action to the introduced comestible and flavoring mixture, and (2) a downstream portion extending outwardly from the shaft the width of the interior of the dispensing nozzle providing shearing action to the comestible-flavoring mixture and removing the more dense portion of the mixture from the walls of the nozzle and folding it back into the remainder of the mixture.

2. The device of claim 1 wherein the downstream portion further includes diametrically projecting rods substantially normal to the shaft providing further shearing action.

3. The device of claim 1 wherein the downstream portion includes shearing vanes extending the width of the interior of the dispensing nozzle having openings therein permitting passage of the comestible-flavoring mixture therethrough and integral scraping means on the outer terminating edges thereof in contact with the inner surface of the dispensing nozzle.

4. A combination blender and distributor mechanism for use with a comestible dispenser, comprising:

a dispensing nozzle including an outer, reltively fixed first sleeve having a part radially bored therethrough and a larger port axially spaced therefrom, axially moveable second sleeve plunger means sealingly mounted within the first sleeve means and adapted to selectively open and close the larger port, rotatable shaft means coaxially mounted within the first and second sleeve means having a combination agitator and mixer mounted to its lower end, said agitator and mixer comprising (1) a first portion having paddles extending outwardly from the shaft at an angle to the shaft and (z) a second portion downstream from the first portion having scrapers generally parallel to the shaft and adapted to contact the inner surface of the first sleeve, means for rotating the shaft, and means for axially moving the plunger means to expose the larger port to the interior of the first sleeve for introduction of comestible into the dispensing nozzle.

* * * * *